_United States Patent Office_

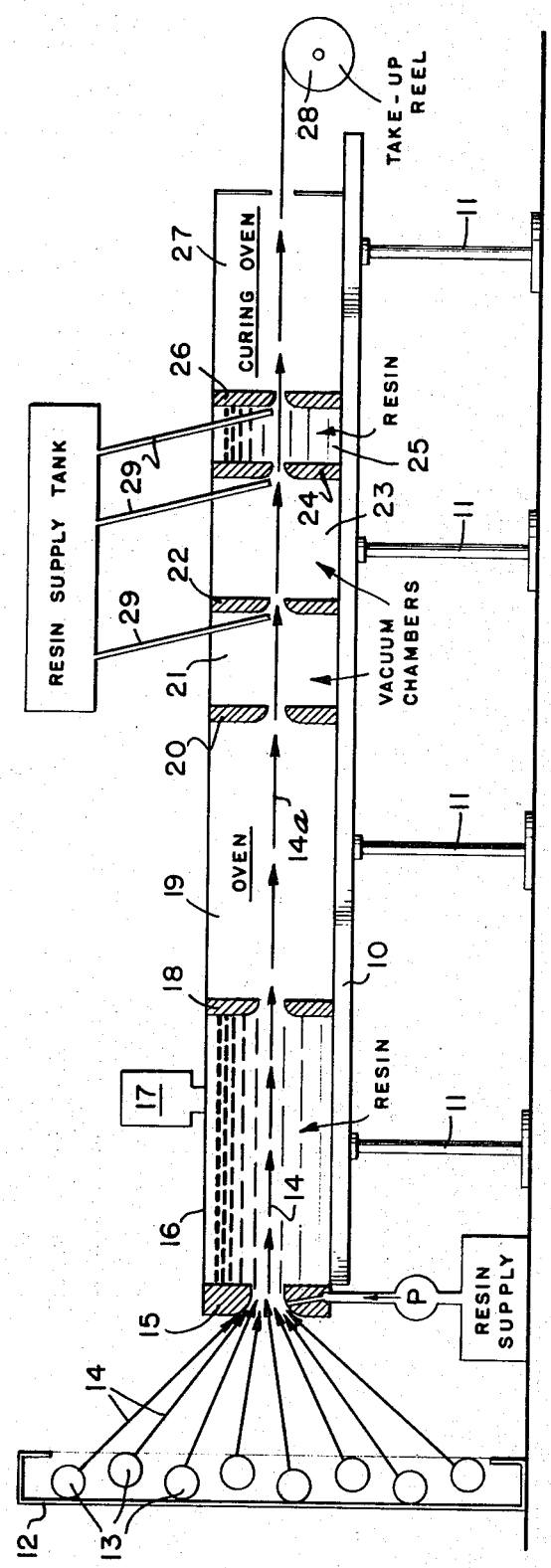

3,533,870
Patented Oct. 13, 1970

3,533,870
METHOD OF FABRICATING A FLEXIBLE IMPREGNATED GLASS FIBER TETHER HAVING MAXIMUM STRENGTH PROPERTIES
John M. Mackay, Ridgecrest, Calif., and Robert B. McKee, Jr., Reno, Nev., assignors to the United States of America as represented by the Secretary of the Navy
Filed July 21, 1966, Ser. No. 566,954
Int. Cl. B32b 17/04
U.S. Cl. 156—180                                      2 Claims

ABSTRACT OF THE DISCLOSURE

A process for fabricating a continuous length of flexible splice-free glass tether which comprises collimating a plurality of fiberglass filaments so that they converge horizontally without touching each other and enter a fixture charged with a thermosetting resin; passing the bundle of resin coated fibers into a vessel with means for removing air from the resin, then through a die small enough to generate high pressure thereby forcing the resin into the filament bundle; passing the bundle into an oven to decrease the viscosity of the resin and through a double vacuum for removal of all volatiles and air; and finally through a sealing and sizing disc. All the filaments travel the same distance from one end of the process to the other with no bends. The tether which is formed by this process is splice-free to a length of over 100,000 feet and has a minimum breaking strength of 1,500 pounds. It is used for a captive balloon and payload at stratospheric altitudes for an indefinite period of time.

---

The invention described herein may be manufactured and used by or for the Government of the United States of America for governmental purposes without the payment of any royalties thereon or therefor.

The invention relates to a new and improved method and apparatus for fabricating a continuous flexible glass tether having a maximum diameter of 0.085″ and a minimum break strength of 1500 pounds.

Many processes are known for making glass rods, shafts, bars, tubes and other elongated structures. To produce a flexible glass rope the typical method has been to pass fiberglass filaments over a tension brake, through a series of fixed guides, over rollers into plastic resin, which has been diluted by a solvent, then into ovens to remove the solvent, and finally through a die to establish the finished size and shape. A final overwrap has been used to maintain a round cross section. The principal disadvantage of the processes of this type is the amount of handling beforce the fiberglass filaments are soaked in the resin thereby resulting in damage to the delicate glass filaments. Also, if the solvent is not completely removed, it will volatilize due to heat curing causing voids in the finished rods. A fairly recent technique uses a short plastic forming die inside which the bundle of resin-coated fibers are cured by a very intense radio frequency field. In this method the resin cure temperature is too high and destroys the property of toughness needed in the finished product. The present invention provides a process for manufacturing a tether comprising 150 ends which consist in excess of 31,200 fiberglass filaments. The tether has a maximum diameter of 0.085″ and a tensile strength of over 1500 pounds.

It is therefore an object of the present invention to provide a high-strength, continuous splice-free length of tether of over 100,000 feet to be used for maintaining a captive balloon and payload at stratospheric altitudes for an indefinite period of time.

Another object is to provide a means for manufacturing splice-free lengths of tether having the strength of steel with less than one-fourth the latter's weight for launching equipment for measurement of atmospheric potential as well as its variation with time.

Other objects, advantages and novel features of the invention wil become apparent from the following detailed description of the invention when considered in conjunction with the accompanying drawing wheren:

The single figure diagrammatically illustrates the present invention which is for a method of fabricating a continuous length of flexible glass tether. The apparatus comprises a long, horizontal frame member 10 supported on a plurality of spaced supports 11. Near the head end of frame member 10 is mounted a creel 12 which holds a plurality of horizontally spaced spools 13 of fiberglass ends 14, each of which is composed of 204 fiberglass filaments. From creel 12 fiberglass ends 14 are drawn at slight tension from spools 13 horizontally through a conical fixture or gathering die 15, which is charged with a thermosetting resin by means of pump P. Ends 14 are coated with resin as they are drawn through die 15 into a resin filled tube 16 to which a transducer (ultrasonic vibrator) 17 is attached which aids in removing air from the resin. As ends 14 converge to pass through die 15 into tube 16 they are not bent nor do they come in contact with each other or any object, such as a guiding means, before they are coated with resin. Ends 14 are completely submerged in the resin bath throughout the entire length of tube 16. The downstream end of tube 16 is provided with a die 18 which is contoured and sized so that the hydraulic pressure created as ends 14 are drawn therethrough force the resin deep into the interstices of the now rod-shaped bundle of ends designated 14a which is formed as they follow a substantially collinear path through tube 16 and die 18 into oven 19. In oven 19 the resin is heated to decrease its viscosity. Next bundle 14a is fed through a die 20 positioned at the exit of oven 19 into a first vacuum chamber 21 and progressively therethrough in a substantially collinear path through another die 22 at the exit of chamber 21 into a second vacuum 23. All air is removed from bundle 14a in this procedure. The double vacuum systems 21 and 23 draws bubbles to the surface of the bundle 14a which are destroyed as the bundle is extruded through dies 22 and 24. Positioned at the exit of second vacuum chamber 23 is a sealing and sizing die 24 through which the bundle of ends 14a are pulled. They are well compacted and shaped in this step. On emerging from die 24 bundle 14a is now passed directly through a coating chamber 25 which is filled with resin which provides a coat or skin. Bundle 14a is finally drawn through die 26 which is mounted at the exit of coating chamber 25 into the curing oven 27. A smooth resistant skin around bundle 14a is produced in this procedure. The finshed tether is wound on take-up reel 28 as it leaves the curing oven. The tether is a flexible resin-bonded fiberglass bundle having a diameter of about 0.085 of an inch with a breaking strength of over 315,000 p.s.i. It has been manufactured without any bends in the above described process, all the threads having traveled the same distance from one end of the process to the other. There are no built-in stresses in the finished tether one of which was 98,000 feet in length.

The openings in all six of the dies are progressively varied in size to collect and shape in an orderly manner all of the ends 14 into the desired cross-sectionat shape and size.

Vacuum chambers 21 and 23 and coating chamber 25 are each provided with a plurality of means, generally designated 29, one end of each attached to a resin tank 30 and the other end adjacent dies 22, 24 and 26 for flushing the faces of said dies with a fresh supply of resin. The procedure prevents a resin build-up on each die face as bundle 14a is pulled along and also acts to keep the temperature down.

The use of the double vacuum is considered essential to the success of the present invention. All air is removed during this step. The tether spends only about 0.12 of a minute inside the vacuum, but this seems sufficient. The vacuum chambers and coating chamber are provided with reasonable glass covers which permit the operator to open the chambers and remove any broken filaments which may accumulate.

The cure time is regulated by changing the pull speed, noting the color difference in the finished tether, and correlating this color with the test results on samples taken. The best results have been achieved at a production rate of 24 feet per minute.

The necessary temperature and the length dimension of the ovens depends upon the curing characteristics of the resin used and may easily be determined either by experiment or from the resin manufacturer's specifications.

The rate at which the glass threads are drawn forward is so adjusted that the hardening of the resin is finished when the tether leaves the curing oven.

Glass ends used in this invention were procured from a source which manufactures them without twist. The untwisted ends produce a stronger tether than spooled glass which has as much as one twist per inch.

In the present method one of the most important requirements is to keep the glass ends as free as possible from abrasion and bending while they are pulled along. It is especially important to prevent abrasion and bending before the resin is applied to the ends. Also, equal tension is applied to all strands or ends. The entire production line is symmetrical; all of the glass fibers travel the same distance while going through the process and a creel on which the spools of glass are disposed in a circular array is preferred, since they are disposed in a circle in the finished tether. "Single end" glass strands were used, that is, each spool of fiberglass has only one end of 204 filaments. About 150 spools of single-end glass were used in the production of the first continuous, high-strength tether. The 150 glass ends contain 31,200 separate filaments. The ends passed horizontally from the spools into a gathering die where they were wetted with epoxy resin and pulled directly into a tube filled with resin on which was mounted an ultrasonic vibrator. The use of the vibrator at 40,000 c.p.s. aids in the removal of air bubbles from the resin and thereby improves the quality of the tether.

The epoxy resin used herein isa blend of 100 parts DER 332, 10 parts Epon 871 and 3½ parts of $BF_{3MEA}$ catalyst. The temperature at which this process operates varies with the type the resin used (ranging from 40 to 600° F.).

DER 332 is a commercial resin manufactured by Dow Chemical Company. It is a crystal clear liquid consisting essentially of diepoxide O having an epoxide equivalent of 173–179, an average molecular weight of 340–350 and a viscosity at 25° C. of 3,600–6,400 centipoises. Epon 871 is a liquid epoxy resin manufactured by Shell Chemical Company and consists essentially of bisphenol A and epichlorohydrin having an epoxide equivalent of 175 to 210, an average molecular weight of 350 to 40 and a viscosity at 25° C. of 5,000 to 15,000 centipoises. $BF_{3MEA}$ catalyst is a boron trifluoridemonoethylamine complex which mixed with the epoxides give the compounds longer shelf life, but gel and cure in a few minutes at 350° F.

Other resin formulations may be used. The one disclosed herein proved most successful for producing a flexible fiberglass tether.

Fatigue test results indicated that the tether has an indefinite life at 60% static ultimate load. Tensile tests indicated that 350,000 p.s.i. composite strength is consistently achieved.

Copper wires may be embedded into the tether as it is being fabricated in accordance with this process at only a slight penalty in weight and tensile strength. A conducting outer layer may be deposited over the tether to to provide a coaxial conductor. Such a technique would provide a power source to and communication with an airborne system.

Obviously, many modifications and variations of the present invention are possible in the light of the above teachings.

What is claimed is:

1. A method for fabricating a continuous length of flexible glass tether having a maximum diameter of 0.085 of an inch and a minimum break strength of 1,500 pounds, which comprises the steps of
   (a) continuously drawing a plurality of untwisted fiberglass ends under tension in a collinear direction along a first predetermined path by means which prevent said ends from bending or scuffing each other; said ends consisting of a plurality of fiberglass filaments;
   (b) wetting the ends with a thermosetting resin as they are forwarded through a gathering die into a second predetermined path submerged in resin; said resin covering and adhering to said ends;
   (c) forwarding the resin-wet ends through a die where they are collected into a rod-shaped bundle having the desired cross-sectional form;
   (d) heating said bundle in an oven to decrease the viscosity of the resin;
   (e) expelling air entrained in the bundle by forwarding it through a double vacuum chamber, each chamber being provided with dies having openings progressively sized whereby air bubbles formed on the outside of said bundle are destroyed as the bundle is drawn therethrough;
   (f) coating said bundle with a thermosetting resin as it emerges through a sizing die into a chamber filled with resin; and
   (g) curing said bundle
      steps (a) through (g) proceeding in a continuous horizontal substantially straight line.

2. A method for fabricating a continuous length of flexible splice-free glass tether which consists of
   pulling a plurality of untwisted fiberglass ends horizontally and at slight tension from spools holding said ends directly into a gathering die; said die being charged by suitable means with a thermosetting resin whereby each end is coated with resin as it passes into said die;
   pulling said resin-wet ends in a collinear path through said die into a resin-filled tube where they are wetted again; said tube being fitted with vibrator means for removing air from said resin;
   drawing said wet ends in a substantially collinear path through said resin-filled tube and thence through a second die which is contoured and sized to form a bundle of resin-coated ends;
   pulling said bundle in a collinear path through an oven whereby said bundle is heated to decrease the viscosity of said resin;
   drawing the heated bundle in a substantially collinear path through a third die into a first vacuum chamber and progressing therethrough via a fourth die into a second vacuum chamber whereby bubbles of entrained air are drawn to the surface of the bundle and are destroyed as said bundle passes through said fouth die;
   pulling said bundle through said second vacuum chamber via a fifth die into a coating chamber containing a resin which provides a skin for said bundle; said fifth die being a sealing and sizing die whereby said bundle of ends are compacted and shaped;
   drawing said shaped and coated bundle from said coating chamber through a sixth die into a curing chamber; and winding said cured bundle on a take-up spool.

References Cited

UNITED STATES PATENTS

| | | | |
|---|---|---|---|
| 2,620,894 | 12/1952 | Peterson et al. | 55—15 |
| 2,684,318 | 7/1954 | Meek | 156—180 |
| 2,721,820 | 10/1955 | Von Reis et al. | 156—180 |
| 2,778,404 | 1/1957 | Macy et al. | 156—180 |
| 2,848,354 | 8/1958 | Daley | 117—119 XR |
| 2,871,911 | 2/1959 | Goldsworthy et al. | 156—441 XR |
| 2,894,483 | 7/1959 | Stahl | 118—50 |
| 2,948,649 | 8/1960 | Pancherz | 156—180 |
| 3,034,566 | 5/1962 | McKay | 156—180 XR |

JOHN T. GOOLKASIAN, Primary Examiner

D. J. FRITSCH, Assistant Examiner

U.S. Cl. X.R.

156—286; 161—175, 176